(12) United States Patent
Lin et al.

(10) Patent No.: US 11,870,703 B2
(45) Date of Patent: Jan. 9, 2024

(54) METHOD FOR CONFIGURING AND MANAGING TSN NETWORK AND SYSTEM APPLYING THE METHOD

(71) Applicant: Nanning FuLian FuGui Precision Industrial Co., Ltd., Nanning (CN)

(72) Inventors: Zhuo-Jia Lin, Shenzhen (CN); Shi-Li Wang, Shenzhen (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 98 days.

(21) Appl. No.: 17/400,496

(22) Filed: Aug. 12, 2021

(65) Prior Publication Data

US 2022/0385594 A1 Dec. 1, 2022

(30) Foreign Application Priority Data

May 28, 2021 (CN) .......................... 202110594915.X (51) Int. Cl.
*H04L 47/72* (2022.01)
*H04L 41/16* (2022.01)
*H04L 12/46* (2006.01)
*H04L 43/022* (2022.01)

(52) U.S. Cl.
CPC .......... *H04L 47/72* (2013.01); *H04L 12/4645* (2013.01); *H04L 41/16* (2013.01); *H04L 43/022* (2013.01)

(58) Field of Classification Search
CPC ..... H04L 47/72; H04L 12/4645; H04L 41/16; H04L 43/022
See application file for complete search history.

(56) References Cited

FOREIGN PATENT DOCUMENTS

| CN | 110167068 A | 8/2019 |
|---|---|---|
| CN | 111200848 A | 5/2020 |
| CN | 111327451 A | 6/2020 |
| WO | 2020104016 A1 | 5/2020 |

*Primary Examiner* — Brian Whipple
(74) *Attorney, Agent, or Firm* — ScienBiziP, P.C.

(57) ABSTRACT

In a method for configuring and managing a Time Sensitive Networking (TSN) network, a network packet is regularly captured and parameters are extracted. The parameters are submitted to a distributed learning model for matching an application according to the parameters, and a network requirement of the application is obtained. Such obtained network requirements are uploaded to a centralized network configuration (CNC) through a message transmission protocol, and a configuration of the network requirement is calculated through the CNC. The configuration calculated by the CNC is received and delivered to a TSN switch, causing the TSN switch to dynamically update the network configuration accordingly.

17 Claims, 6 Drawing Sheets

METHOD FOR CONFIGURING AND MANAGING TSN NETWORK AND SYSTEM APPLYING THE METHOD

CROSS-REFERENCE TO RELATED APPLICATIONS

This application claims priority to Chinese Patent Application No. 202110594915.X filed on May 28, 2021, the contents of which are incorporated by reference herein.

FIELD

The subject matter herein generally relates to TSN network configuration technology, in particular to a TSN network configuration method and system.

BACKGROUND

Time Sensitive Networking (TSN) is a set of Ethernet standards that makes Ethernet protocols real-time and deterministic. It provides real-time control and communicates all standard IT data to provide the integration of control, measurement, configuration, UI, and file exchange infrastructure with power. For TSN, after clock synchronization and scheduling strategies, network configuration issues must be considered. IEEE802.1Qcc is used to configure the TSN infrastructure and switch terminal nodes for plug-and-play capabilities. The centralized configuration mode is adopted, which is composed of one or more Centralized User Configuration (CUC) and one Centralized Network Configuration (CNC). CUC formulates the periodic time-related requirements of users and processing of data for transmission to CNC. CNC calculates the TSN configuration to meet the requirements.

CUC configuration is relatively cumbersome and requires users to provide user requirements based on TSN applications. The required parameters include data transmission interval, start transmission time, number of transmission network packets, network packet size, network redundancy requirements, and maximum delay. The TSN network configuration manager is required to be very familiar with the TSN protocol and TSN related applications. It is difficult for users who are not familiar with the TSN protocol and TSN applications to manage and configure these parameters.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Figure 1:
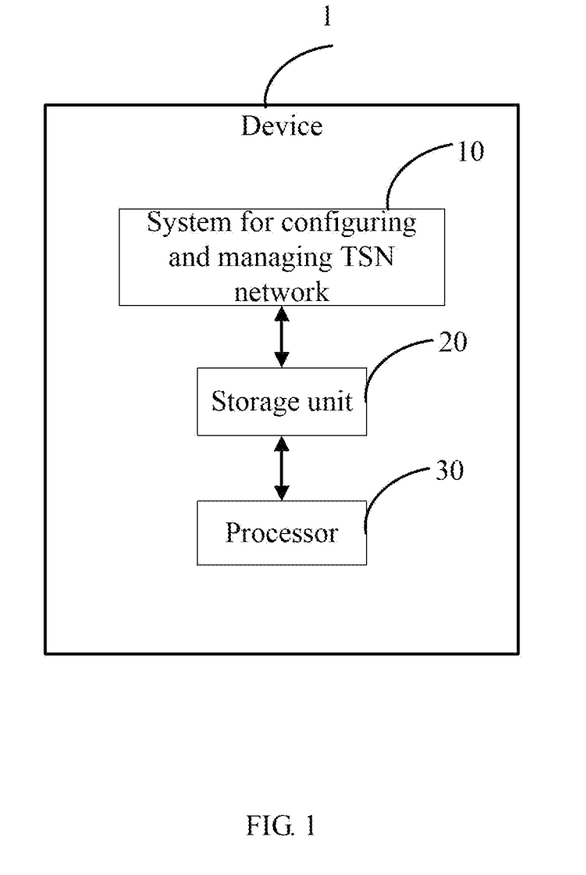
FIG. 1 is a block diagram of an exemplary embodiment of functional modules of a device for configuring and managing TSN network.

FIG. 1 is a block diagram of an exemplary embodiment of functional modules of a device for configuring and managing TSN network (device 1). The device 1 includes a system for configuring and managing TSN network 10, a storage unit 20, and a processor 30.

Wherein, the storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read only memory (EEPROM), a programmable read only memory (PROM), a magnetic memory, a magnetic disk, an optical disk, and so on. The processor 40 may be a central processing unit (CPU), a controller, a microcontroller, a microprocessor, or other data processing chip.

Figure 2:
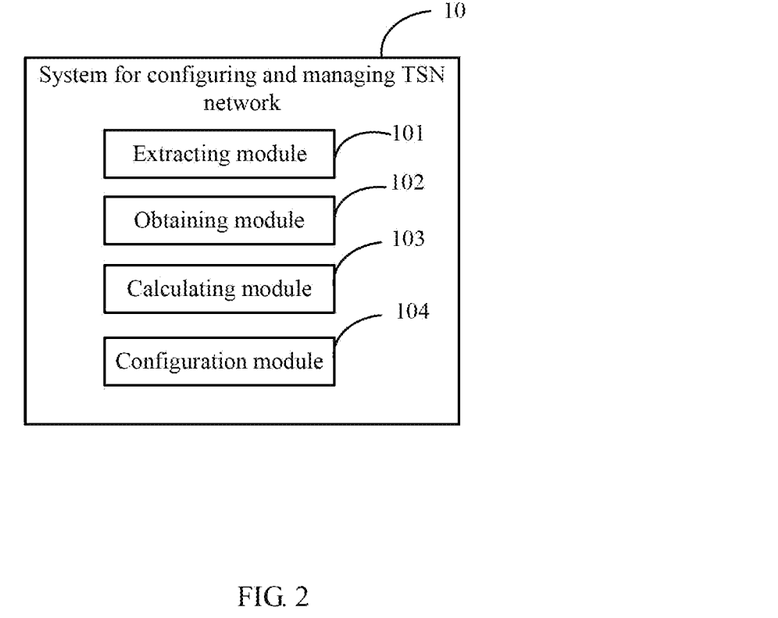
FIG. 2 is a block diagram of an exemplary embodiment of functional modules of a system for configuring and managing TSN network.

FIG. 2 illustrates a block diagram of an exemplary embodiment of functional modules of the system for configuring and managing TSN network 10.

The system for configuring and managing TSN network 10 includes an extracting module 101, an obtaining module 102, a calculating module 103, and a configuration module 104. The modules are configured to be executed by one or more processors (in the embodiment, one processor 30) to realize the method. The modules referred to are computer program segments that perform a specific instruction. The storage unit 20 is used to store program code and other data of the system for configuring and managing TSN network 10. The processor 30 is used to execute the program code stored in the storage unit 20.

The extracting module 101 regularly captures a network packet and extracts parameters.

Specifically, the extracting module 101 captures the network packet sent by a local machine, and determines whether the network packet has a virtual local area network tag (Vlan Tag). If the network packet has the Vlan Tag, then Ethernet type, packet sending time, packet size, source IP address, and destination IP address are extracted and encapsulated into a message with a specific data exchange format, such as JSON format.

The application types of TSN are divided into typical TSN applications and new TSN applications. In the embodiment, the extracting module 101 determines that the application is a TSN application or a non-TSN application according to the VLAN Tag of the network packet. In the embodiment, the parameters include Ethernet type, packet sending time, packet size, source IP address, destination IP address, and other parameters.

In the embodiment, the extracting module 101 also determines whether the network packet is sent by the local machine in a particular manner, the manner being: the extracting module 101 determines whether a source MAC address of the network packet is equal to a local MAC address and when the source MAC address of the network packet is equal to the MAC address of the local machine, the network packet is treated as a network packet sent by the local machine. Otherwise, the network packet is not treated as a network packet sent by the local machine and the network packet is not captured.

The obtaining module 102 submits the parameters to a distributed learning model, and matches the application according to the parameters. A network requirement of the application through the distributed learning model is obtained.

The calculating module 103 uploads the obtained network requirements to a centralized network configuration (CNC) through a message transmission protocol, such as Message Queuing Telemetry Transport (MQTT) protocol, and calculates a configuration of the network requirement through the CNC.

In the embodiment, the CNC calculates a reserved bandwidth and a gate control list by the CNC according to a TSN network protocol, such as 802.1Qav and 802.1Qbv protocols.

The configuration module 104 receives the configuration calculated by the CNC, and delivers the configuration to a Time Sensitive Networking (TSN) switch, causing the TSN switch to dynamically update the network configuration according to the configuration.

Specifically, the configuration calculated by the CNC includes but is not limited to the reserved bandwidth and the gate control list. The obtaining module 102 receives and delivers the reserved bandwidth and the gate control list calculated by the CNC to the TSN switch, causing the TSN switch to dynamically update the network configuration according to the configuration. For example, the TSN switch will configure a specific network port according to the reserved bandwidth or gate control list sent by the configuration module 104 to meet the transmission bandwidth of the application.

The dynamic updating of the network configuration avoids the reserved bandwidth being too low when the application transmission requirement increases, which may cause packet loss. If the application transmission requirement was to decrease, a fixed bandwidth would still be occupied, causing a waste of network resources.

In the embodiment, the configuration module 104 delivers the configuration to the TSN switch through a gateway protocol, such as NETCONFIG/YANG protocol or SNMP protocol.

Further, the device 1 also includes a database, which is used to store current network requirements of various applications. In the embodiment, typical TSN applications (such as EtherCAT over TSN and OPC UA over TSN) had such a database which was widely used in the early days, and there will be more accurate configuration reference default values. For new TSN applications, in the embodiment, a large number of samples are counted through continuous packet capture analysis, thus network requirements in the database are gradually added and updated, and the database synchronization of neighboring devices can be used to exchange network requirements for new applications, making the network requirements more accurate and universal.

The extracting module 101 further distinguishes between types of applications, and determines a type of application to be a typical TSN application or not a typical TSN application (also called new TSN applications).

When the extracting module 101 determines the type of application to be the typical TSN application, the network requirements as calculated are further updated to the database and then directly delivered to the CNC by the configuration module 104.

In the embodiment, if the network requirements of the typical TSN application are updated, there is no need for synchronization with the database of the neighboring devices, because each database already has default reference values which are relatively accurate.

When the extracting module 101 determines the type of application not to be the typical TSN application, the configuration module 104 updates network requirement calculation to the database and then delivers same to the CNC. The network requirements as calculated are synchronized with the databases of neighboring devices.

If the network requirements of the new TSN application are updated, the databases of neighboring devices need to be synchronized, so that the network requirements of the new TSN application can be calculated that are more suitable for multiple devices of the same type. When the statistical sample is sufficient, the new TSN application can also be transformed into the typical TSN application, and the network requirements generated by each database synchronously can also become the more accurate reference default values.

The configuration module 104 further:

Determines whether there is the target type of application running on the local machine upon receiving a request sent by the neighboring devices for an application of a target type. When there is an application of the target type running, the network requirements are not updated, and the network requirements as calculated by the machine are applied. If there is no application of the target type running, the network requirements sent by the neighboring devices are updated to the database.

When the device 1 receives the message that the database of the neighboring devices are updated, it needs to determine whether the updated application type is running on the local machine. If there is, it will not be updated, so as not to affect the packet transmission of the application running on the local machine due to changes in network requirements. If there is not, the network requirements sent by the neighboring devices are updated to the database.

In the disclosed method, the user's network requirement algorithm is obtained automatically. Through the distributed learning model, the network requirement of new applications can be calculated, which reduces the input of network requirement parameters by users, improves user experience, meets the transmission performance requirements of new applications, and improves the accuracy of the network requirement parameters. The real-time performance and high reliability of the TSN network are also improved.

Figure 3:
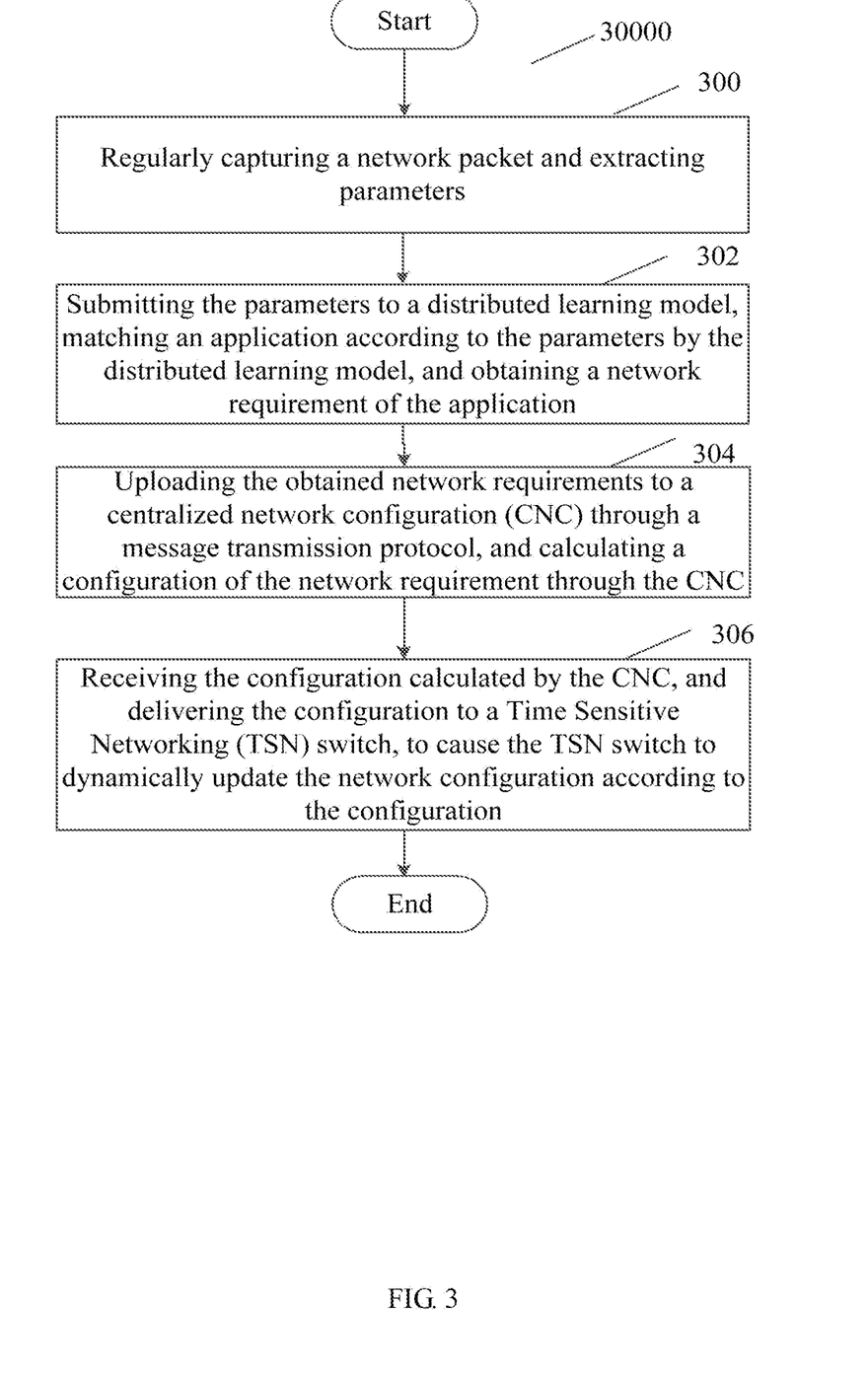
FIG. 3 is a flowchart of a method in one embodiment for configuring and managing TSN network.

Referring to FIG. 3, a flowchart of a method (method 30000) for configuring and managing TSN network in accordance with one embodiment is applied in the device 1, and the function modules 101-104 as FIG. 2 illustrates are executed by the processor 30. Each block shown in FIG. 3 represents one or more processes, methods, or subroutines, carried out in the exemplary method 30000. Additionally, the illustrated order of blocks is by example only and the order of the blocks can be changed. The method 30000 can begin at block 300.

At block 300, regularly capturing a network packet and extracting parameters.

Figure 4:
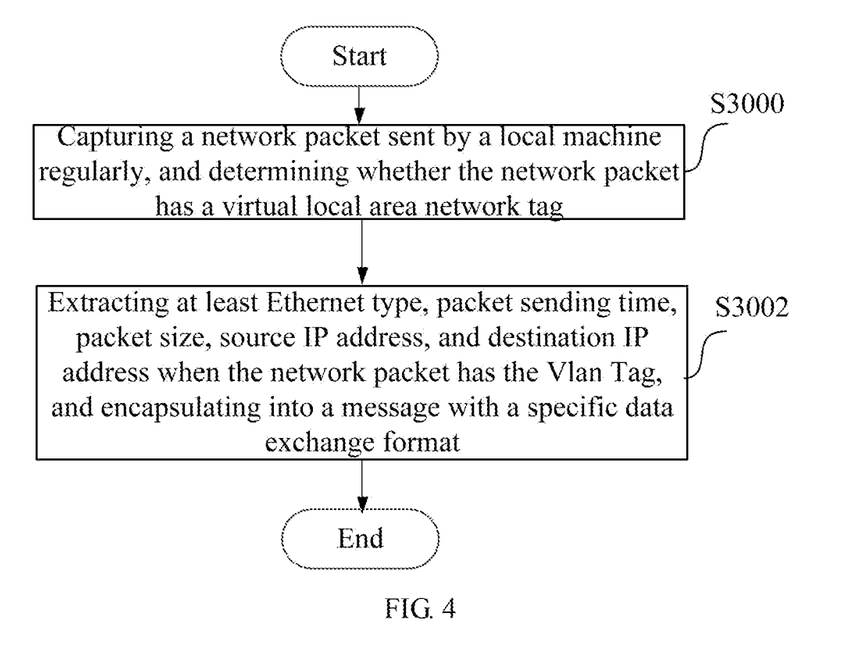
FIG. 4 is a flowchart of sub-steps of step S300 in an embodiment of the present disclosure.

Specifically, as shown in FIG. 4, the step S300 further includes the steps:

Step S3000, capturing a network packet sent by a local machine, and determining whether the network packet has a virtual local area network tag (Vlan Tag); step S3002, extracting at least Ethernet type, packet sending time, packet size, source IP address, and destination IP address when the network packet has the Vlan Tag, and encapsulating into a message with a specific data exchange format, such as JSON format.

The application types of TSN are divided into typical TSN applications and new TSN applications. In the embodiment, the device 1 determines that the application is a TSN application or a non-TSN application according to the VLAN Tag of the network packet. In the embodiment, the parameters include Ethernet type, packet sending time, packet size, source IP address, destination IP address and other parameters.

In the embodiment, determining whether the network packet is sent by the local machine in a particular manner, the manner being:

Determining whether a source MAC address of the network packet is equal to a local MAC address; when the source MAC address of the network packet is equal to the MAC address of the local machine, the network packet is treated as a network packet sent by the local machine; otherwise, the network packet is not treated as a network packet sent by the local machine and the network packet is not captured.

Step S302, submitting the parameters to a distributed learning model, matching an application according to the parameters by the distributed learning model, and obtaining a network requirement of the application.

Step S304, uploading the obtained network requirements to a centralized network configuration (CNC) through a message transmission protocol, and calculating a configuration of the network requirement through the CNC.

For example, the obtained network requirements are uploaded to a centralized network configuration (CNC) through a message transmission protocol, such as Message Queuing Telemetry Transport (MQTT) protocol, and a configuration of the network requirement is calculated through the CNC. The CNC calculates a reserved bandwidth and a gate control list by the CNC according to a TSN network protocol, such as 802.1Qav and 802.1Qbv protocols.

Step S306, receiving the configuration calculated by the CNC, and delivering the configuration to a Time Sensitive Networking (TSN) switch, causing the TSN switch to dynamically update the network configuration according to the configuration.

Specifically, the configuration calculated by the CNC includes but is not limited to: the reserved bandwidth and the gate control list. The device 1 receives and delivers the reserved bandwidth and the gate control list calculated by the CNC to the TSN switch, causing the TSN switch to dynamically update the network configuration according to the configuration. For example, the TSN switch will configure a specific network port according to the reserved bandwidth or gate control list to meet the transmission bandwidth of the application.

The dynamic updating of the network configuration avoids the reserved bandwidth being too low when the application transmission requirement increases, which may cause packet loss. If the application transmission requirement was to decrease, a fixed bandwidth would still be occupied, causing a waste of network resources.

In the embodiment, the device 1 delivers the configuration to the TSN switch through a gateway protocol, such as NETCONFIG/YANG protocol or SNMP protocol.

Further, the device 1 also includes a database, which is used to store current network requirements of various applications. In the embodiment, typical TSN applications (such as EtherCAT over TSN and OPC UA over TSN) had such a database which was widely used in the early days, and there will be more accurate configuration reference default values. For new TSN applications, in the embodiment, a large number of samples are counted through continuous packet capture analysis, thus network requirements in the database are gradually added and updated, and the database synchronization of neighboring devices can be used to exchange network requirements for new applications, making the network requirements more accurate and universal.

Figure 5:
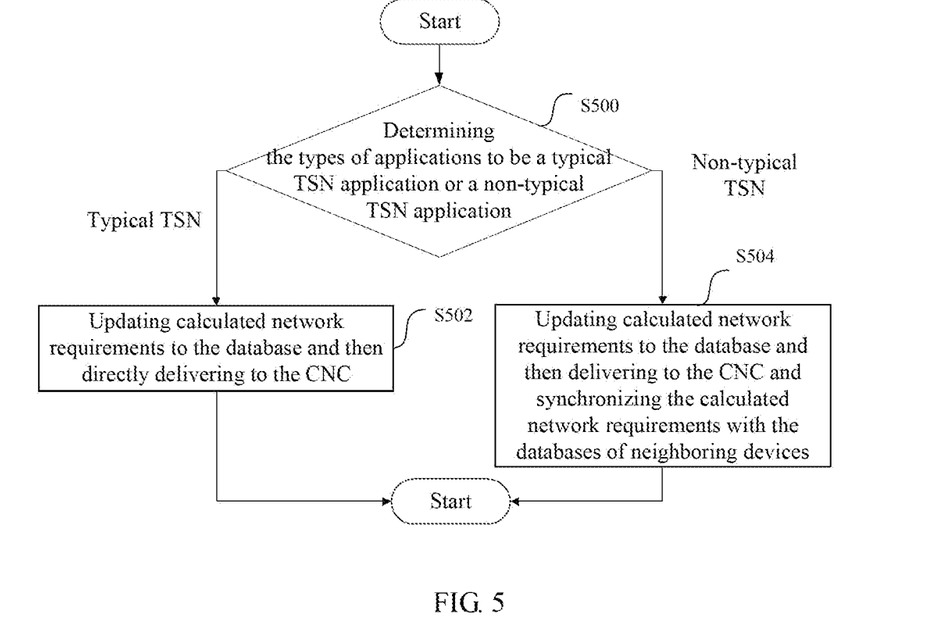
FIG. 5 is a flowchart of another method for configuring and managing TSN network.

Specifically, FIG. 5 is a flowchart of a method for configuring and managing TSN network according to another embodiment of the present application, and the method for configuring and managing TSN network further includes:

Step S500, determining the types of applications to be a typical TSN application or a non-typical TSN application, when the application is the typical TSN application, step S502 is executed; when the application is the non-typical TSN application, step S504 is executed.

Step S502, updating calculated network requirements to the database and then directly delivering to the CNC.

In the embodiment, if the network requirements of the typical TSN application are updated, there is no need for synchronization with the database of the neighboring devices, because each database already has default reference values which are relatively accurate.

Step S504, updating calculated network requirements to the database and then delivering to the CNC and synchronizing the calculated network requirements with the databases of neighboring devices.

If the network requirements of the new TSN application are updated, the databases of neighboring devices need to be synchronized, so that the network requirements of the new TSN application can be calculated that are more suitable for multiple devices of the same type. When the statistical sample is sufficient, the new TSN application can also be transformed into the typical TSN application, and the network requirements generated by each database synchronously can also become the more accurate reference default values.

Figure 6:
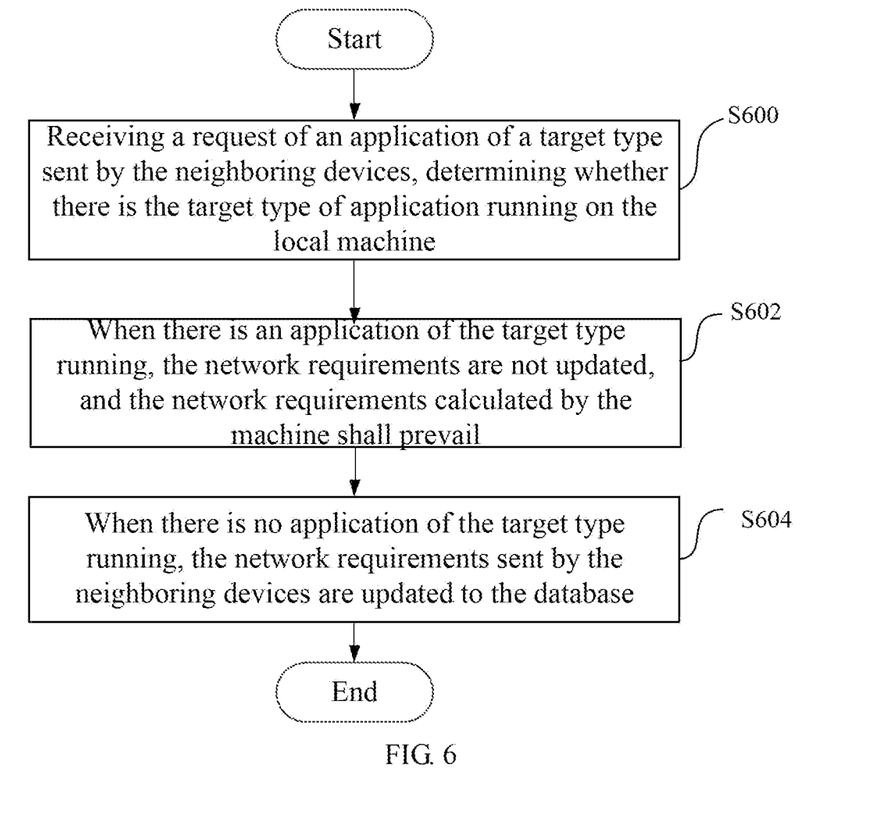
FIG. 6 is a flowchart of another method for configuring and managing TSN network.

Specifically, as shown in FIG. 6, FIG. 6 is a flowchart of a method for configuring and managing TSN network according to another embodiment of the present application, and the method for configuring and managing TSN network further includes:

Step S600, receiving a request of an application of a target type sent by the neighboring devices, determining whether there is the target type of application running on the local machine.

Step S602, when there is an application of the target type running, the network requirements are not updated, and the network requirements calculated by the machine shall prevail.

Step S604, when there is no application of the target type running, the network requirements sent by the neighboring devices are updated to the database.

When the device 1 receives the message that the database of the neighboring devices are updated, it needs to determine whether the updated application type is running on the local machine. If there is, it will not be updated, so as not to affect the packet transmission of the application running on the local machine due to changes in network requirements. If there is not, the network requirements sent by the neighboring devices are updated to the database.

In the disclosed method, the user's network requirement algorithm is obtained automatically. Through the distributed learning model, the network requirement of new applications can be calculated, which reduces the input of network requirement parameters by users, improves user experience, meets the transmission performance requirements of new applications, and improves the accuracy of the network requirement parameters. The real-time performance and high reliability of the TSN network are also improved.

The embodiments shown and described above are only examples. Many details are often found in the relevant art and such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A management and configuration method for a Time Sensitive Networking (TSN) network, applied to a device, wherein the method comprises:
    capturing a network packet regularly and extracting parameters;
    submitting the parameters to a distributed learning model, matching an application according to the parameters by the distributed learning model, and obtaining a network requirement of the application;
    uploading the obtained network requirement to a centralized network configuration (CNC) through a message transmission protocol, and calculating a configuration of the network requirement by the CNC;
    receiving the configuration calculated by the CNC, and delivering the configuration to a TSN switch, to cause the TSN switch to dynamically update network configuration according to the configuration.

2. The management and configuration method for the TSN network of claim 1, wherein the calculating a configuration of the network requirement by the CNC comprises:
    calculating a reserved bandwidth and a gate control list by the CNC according to a TSN network protocol.

3. The management and configuration method for the TSN network of claim 1, wherein the calculating a configuration of the network requirement by the CNC comprises:
    delivering the configuration to the TSN switch through a gateway protocol.

4. The management and configuration method for the TSN network of claim 1, wherein the capturing a network packet regularly and extracting parameters comprises:
    capturing a network packet sent by a local machine regularly, and determining whether the network packet has a virtual local area network tag (Vlan Tag);
    extracting at least Ethernet type, packet sending time, packet size, source IP address, and destination IP address when the network packet has the Vlan Tag, and encapsulating into a message with a specific data exchange format.

5. The management and configuration method for the TSN network of claim 4, wherein the capturing a network packet sent by the local machine regularly comprises:
    determining whether a source MAC address of the network packet is equal to a local MAC address;
    when the source MAC address of the network packet is equal to the MAC address of the local machine, determining that the network packet is a network packet sent by the local machine;
    otherwise, determining that the network packet is not a network packet sent by the local machine.

6. The management and configuration method for the TSN network of claim 1, wherein the device further comprises a database, the database is configured to store network requirements of various current applications, and the method further comprises:
    distinguishing types of the applications, and the types of applications comprise typical TSN applications and non-typical TSN applications;
    updating calculated network requirements to the database and then directly delivering to the CNC when the application is a typical TSN application.

7. The management and configuration method for the TSN network of claim 6, further comprising:
    updating calculated network requirements to the database and then delivering to the CNC when the application is a non-typical TSN application;
    synchronizing the calculated network requirements with the databases of neighboring devices.

8. The management and configuration method for the TSN network of claim 7, further comprising:
    after receiving a request of an application of a target type sent by one of the neighboring devices, whether there is the target type of application running on the local machine is determined;
    prevailing the network requirements calculated by the local machine when there is an application of the target type running, the network requirements are not updated;
    updating the network requirements sent by the neighboring devices to the database when there is no application of the target type running.

9. A management and configuration system for a Time Sensitive Networking (TSN) network, the TSN network configuration system comprising:
    at least one processor;
    a storage unit; and one or more programs that are stored in the storage unit and executed by the at least one processor, the one or more programs comprising instructions for:

capturing a network packet regularly and extracting parameters;

submitting the parameters to a distributed learning model, matching an application according to the parameters by the distributed learning model, and obtaining a network requirement of the application;

uploading the obtained network requirement to a centralized network configuration (CNC) through a message transmission protocol, and calculating a configuration of the network requirement by the CNC;

receiving the configuration calculated by the CNC, and delivering the configuration to a TSN switch, to cause the TSN switch to dynamically update network configuration according to the configuration.

10. The management and configuration system for the TSN network as claimed in claim 9, wherein the calculating a configuration of the network requirement by the CNC comprises:

calculating a reserved bandwidth and a gate control list by the CNC according to a TSN network protocol.

11. The management and configuration system for the TSN network as claimed in claim 9, wherein the calculating a configuration of the network requirement by the CNC comprises:

delivering the configuration to the TSN switch through a gateway protocol.

12. The management and configuration system for the TSN network as claimed in claim 9, wherein the capturing a network packet regularly and extracting parameters comprises:

capturing a network packet sent by a local machine regularly, and determining whether the network packet has a virtual local area network tag (Vlan Tag);

extracting at least Ethernet type, packet sending time, packet size, source IP address, and destination IP address when the network packet has the Vlan Tag, and encapsulating into a message with a specific data exchange format.

13. The management and configuration system for the TSN network as claimed in claim 12, wherein the capturing a network packet sent by the local machine regularly comprises:

determining whether a source MAC address of the network packet is equal to a local MAC address;

when the source MAC address of the network packet is equal to the MAC address of the local machine, determining that the network packet is a network packet sent by the local machine;

otherwise, determining that the network packet is not a network packet sent by the local machine.

14. The management and configuration system for the TSN network as claimed in claim 9, wherein the management and configuration system for the TSN network further comprises a database, the database is configured to store network requirements of various current applications, and the one or more programs further comprising instructions for:

distinguishing types of the applications, and the types of applications comprise typical TSN applications and non-typical TSN applications;

updating calculated network requirements to the database and then directly delivering to the CNC when the application is a typical TSN application.

15. The management and configuration system for the TSN network as claimed in claim 14, the one or more programs further comprising instructions for:

updating calculated network requirements to the database and then delivering to the CNC when the application is a non-typical TSN application;

synchronizing the calculated network requirements with the databases of neighboring devices.

16. The management and configuration system for the TSN network as claimed in claim 15, the one or more programs further comprising instructions for:

after receiving a request of an application of a target type sent by one of the neighboring devices, whether there is the target type of application running on the local machine is determined;

prevailing the network requirements calculated by the local machine when there is an application of the target type running, the network requirements are not updated;

updating the network requirements sent by the neighboring devices to the database when there is no application of the target type running.

17. A non-transitory computer-readable storage medium in which computer programs are stored, and the computer programs can be executed by at least one processor, to enforce following steps:

capturing a network packet regularly and extracting parameters;

submitting the parameters to a distributed learning model, matching an application according to the parameters by the distributed learning model, and obtaining a network requirement of the application;

uploading the obtained network requirement to a centralized network configuration (CNC) through a message transmission protocol, and calculating a configuration of the network requirement by the CNC;

receiving the configuration calculated by the CNC, and delivering the configuration to a TSN switch, to cause the TSN switch to dynamically update network configuration according to the configuration.

* * * * *